United States Patent [19]

Carr et al.

[11] Patent Number: 5,254,243
[45] Date of Patent: Oct. 19, 1993

[54] WATER CONDITIONING SYSTEM AND AN ELECTRONIC CONTROL THEREFOR

[75] Inventors: Keith E. Carr, Lincoln Township, Berrien County; Edward C. Peterson, St. Joseph Township, Berrien County, both of Mich.

[73] Assignee: Whirlpool Corporation, Benton Harbor, Mich.

[21] Appl. No.: 902,198

[22] Filed: Jun. 22, 1992

[51] Int. Cl.$^5$ .................... B01D 29/92; B01D 61/20
[52] U.S. Cl. ..................... 210/94; 210/110; 210/134; 210/135; 210/257.2; 210/321.65
[58] Field of Search ............... 210/87, 90, 94, 109, 210/110, 117, 134, 137, 257.2, 335, 259, 321.65, 135

[56] References Cited

U.S. PATENT DOCUMENTS

| | | |
|---|---|---|
| 4,086,166 | 4/1978 | Martin .................. 210/321.65 |
| 4,160,727 | 7/1979 | Harris, Jr. ................ 210/23 H |
| 4,626,346 | 12/1986 | Hall ......................... 210/110 |
| 4,770,770 | 9/1988 | Regunathan et al. ........ 210/257.2 |
| 4,773,991 | 9/1988 | Aid .......................... 210/257.2 |
| 4,801,375 | 1/1989 | Padilla ..................... 210/100 |
| 4,808,302 | 2/1989 | Beall ....................... 210/257.2 |
| 4,885,085 | 12/1989 | Beall, Jr. .................. 210/137 |
| 4,909,934 | 3/1990 | Brown et al. ............... 210/257.2 |
| 4,925,551 | 5/1990 | Lipshultz et al. ............ 210/140 |
| 5,096,574 | 3/1992 | Birdsong et al. ............. 210/90 |

OTHER PUBLICATIONS

Aquatec CDP 6000 Water Systems Product and Services Catalog (18 pages), Published Jun. 1990.

Primary Examiner—Joseph W. Drodge
Attorney, Agent, or Firm—Stephen D. Krefman; Thomas J. Roth; Thomas E. Turcotte

[57] ABSTRACT

An electric control for a water conditioning system includes a solenoid valve which controls water inlet into the system and which is controlled by a flow switch that senses product water flow from a water faucet or other outlet. The flow switch also energizes an indicator lamp for indicating processing of water. The flow switch also controls a second solenoid valve which allows water flow into the pressure or "squeeze" side of a bladder type product water storage tank. When product water flow occurs, the second solenoid valve opens to permit supply water to flow therein, providing additional pressure to the product water side of the storage tank. Accordingly, product water flow is effected from the storage tank to the product water outlet. When a predetermined low pressure is sensed, a pressure switch located on the product water side of the storage tank opens the first solenoid valve to supply water to the system for processing. Also, the solenoid valve which provides squeeze water to the storage tank is closed, thereby permitting product water to flow into the storage tank and accumulator. When a predetermined high pressure is sensed by the pressure switch, the first solenoid valve is closed to terminate water processing, until product water flow is again sensed.

26 Claims, 2 Drawing Sheets

| OPERATION | VALVES | | | SWITCHES | | INDICATOR LAMPS | |
|---|---|---|---|---|---|---|---|
| | $V_1$ | $V_2$ | $V_3$ | $S_4$ | $S_1$ | $L_1$ | $L_2$ |
| TANK FULL | C | C | C | 1 | OPEN | ON | OFF |
| PROCESSING | O | C | C | 2 | OPEN | OFF | ON |
| DISPENSING | O | O | O | 2 | CLOSED | OFF | ON |

WATER CONDITIONING SYSTEM AND AN ELECTRONIC CONTROL THEREFOR

BACKGROUND OF THE INVENTION

The present invention is directed to an electric control for a water conditioner and particularly to an electric control for an under-counter water conditioner using filtration means for purifying and conditioning water including a reverse-osmosis filter and an activated carbon filter.

The use of an electric control for a water conditioning system is well known. In a previous water conditioning system (Aquatec CDP 6000), an "Auto Flush" feature includes an electric solenoid bypass valve. A tank switch senses a predetermined low product water pressure and opens a valve to inlet feed water into the pre-filter. A drawback of the CDP 6000 Water System is that there is an inherent delay between the time the faucet is opened and product water is dispensed to the time water processing begins.

U.S. Pat. No. 4,885,085, Beall, Jr. discloses a hydraulic control valve which controls flow of water through the system. The system includes a storage tank having a bladder for storing processed water. When reduced pressure is sensed, due to flow of pure water through an outlet line, the control valve permits water flow through the system. A disadvantage to the system as described is the time lag between initial product water flow and operation of the control valve. A further disadvantage to the system as described is that, as product water flows out of the storage tank, the product water pressure decreases until the sensed low pressure is sufficient to cause additional water to flow to the squeeze chamber of the product water tank.

The present invention overcomes the disadvantages of previous hydraulic and electric controls for water conditioners by providing a control that permits conditioned water to flow at a steady rate immediately upon the opening of the faucet valve, and to continue to flow at a steady rate thereafter. In addition, the electric control as set forth herein overcomes a disadvantage in prior art hydraulic controls by preventing rapid cycling of the inlet valve at low conditioned water output flow rates.

In addition, the electric control as set forth herein provides water flow to a plurality of water use points through a plurality of outlets. A further advantage of the electric control as set forth herein is the ability to locate product water outlets at a plurality of locations remote from the water conditioner, since no electric controls at the outlets are needed.

SUMMARY OF THE INVENTION

In accordance with the present invention, the disadvantages of the prior art water conditioning systems have been overcome. A water conditioning system includes a pre-filter, a reverse osmosis cartridge, a bladder-type storage tank, a product water accumulator, and a post-treatment carbon filter, and a product water dispensing means. A solenoid valve controls water inlet into the system and is controlled by a flow switch which senses product water flow from a water faucet or other outlet. The flow switch also energizes an indicator lamp for indicating processing of water.

In another aspect of the present invention, when the above-mentioned flow switch senses product water flow, a second solenoid valve which controls water flow into the pressure or "squeeze" side of the bladder type storage tank opens and permits supply water to flow therein, providing additional pressure to the product water side of the storage tank. Accordingly, product water flow is effected from the storage tank to the product water outlet.

When the water faucet or other product water outlet is closed, the flow switch reverts to a normally-open position. A two-pole pressure switch located on the product water side of the storage tank is capable of sensing predetermined low and high pressures, and providing electrical contact through separate poles accordingly. When the pressure switch senses a predetermined low pressure, the water inlet valve is maintained in an open position, supplying water through the pre-filter and to the reverse osmosis cartridge for processing. Also, the solenoid valve which provides squeeze water to the storage tank is closed, thereby permitting product water to flow into the storage tank and accumulator. While the predetermined low pressure is sensed by the pressure switch, the water processing indicator lamp remains energized.

As the product water side of the storage tank fills, pressure increases at the pressure switch. At the predetermined high pressure, the pressure switch moves to the second position, closing the water inlet valve and de-energizing the water processing indicator lamp. In this position, the full tank indicator lamp is energized.

An accumulator tank is included in an embodiment of the system for providing additional product water storage capacity. In addition, a post-treatment activated carbon filter is provided, to remove any remaining odors from the product water.

An object of the invention is to provide an electric control for a water purification system that provides positive control over inlet water into the system, and squeeze water into the product water storage tank.

Another object of the invention is to provide an electric control for a water purification system that directly and reliably monitors and controls the product water pressure in the storage tank, and permits flow of inlet water into the system after the water faucet is closed and until a full storage tank condition is sensed.

Yet another object of the invention is to provide an electric control for a water purification system that is both economical to manufacture and reliable in use.

DESCRIPTION OF THE PREFERRED EMBODIMENTS

Figures 1, 2:
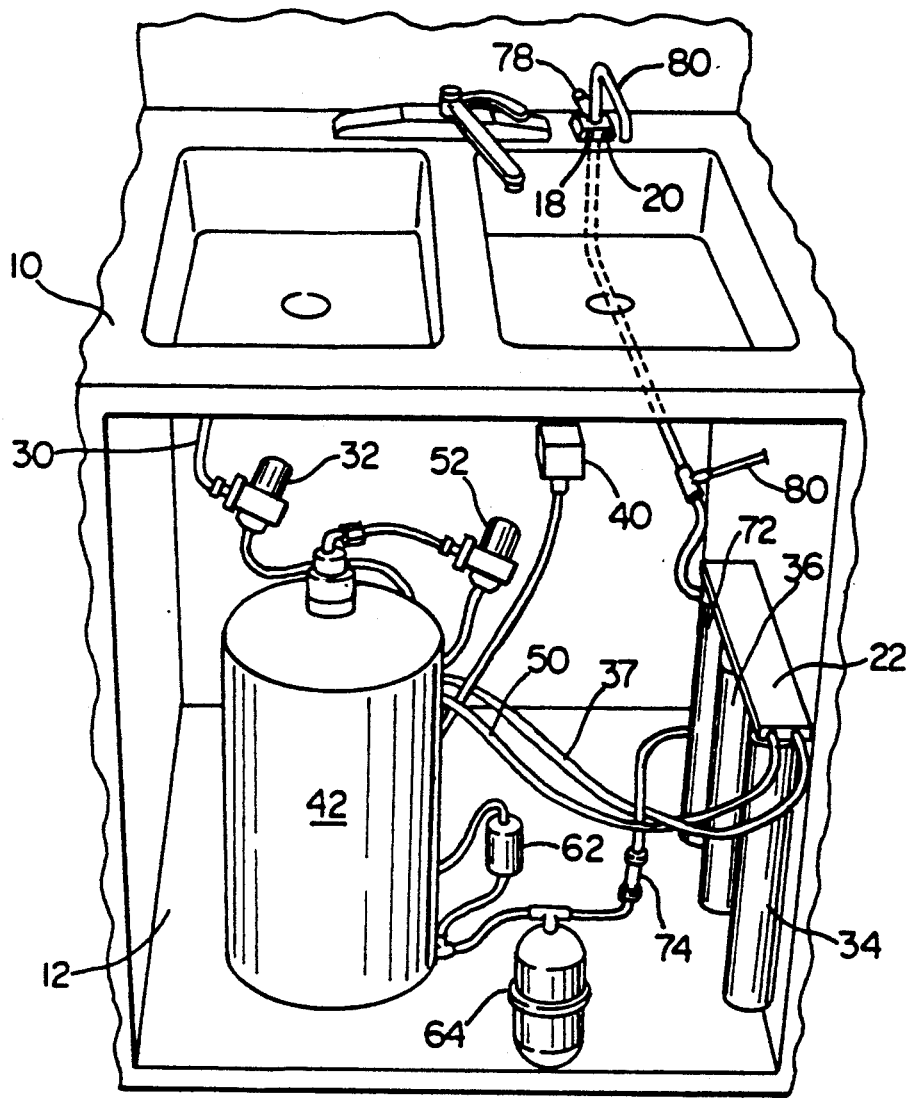
FIG. 1 is a partial cutaway perspective view of an undercounter mounted water purification apparatus in accordance with the present invention.
FIG. 2 is an operation chart of the water purification apparatus and the electric control in accordance with the present invention.

In accordance with the invention as shown in the drawings, a water purification system is mounted below kitchen counter 10 in a cabinet enclosure 12. A water manifold 22 has mounted thereto a pre-filter 34, a reverse osmosis filter cartridge 36, and a carbon filter 72.

A bladder storage tank 42 stores product water for ultimate delivery to a product water faucet 78 or other point of use. In addition, accumulator tank 64 provides additional storage capacity for pressurized product water. An electric control for the water purification system is more fully described hereinafter.

Figure 3:
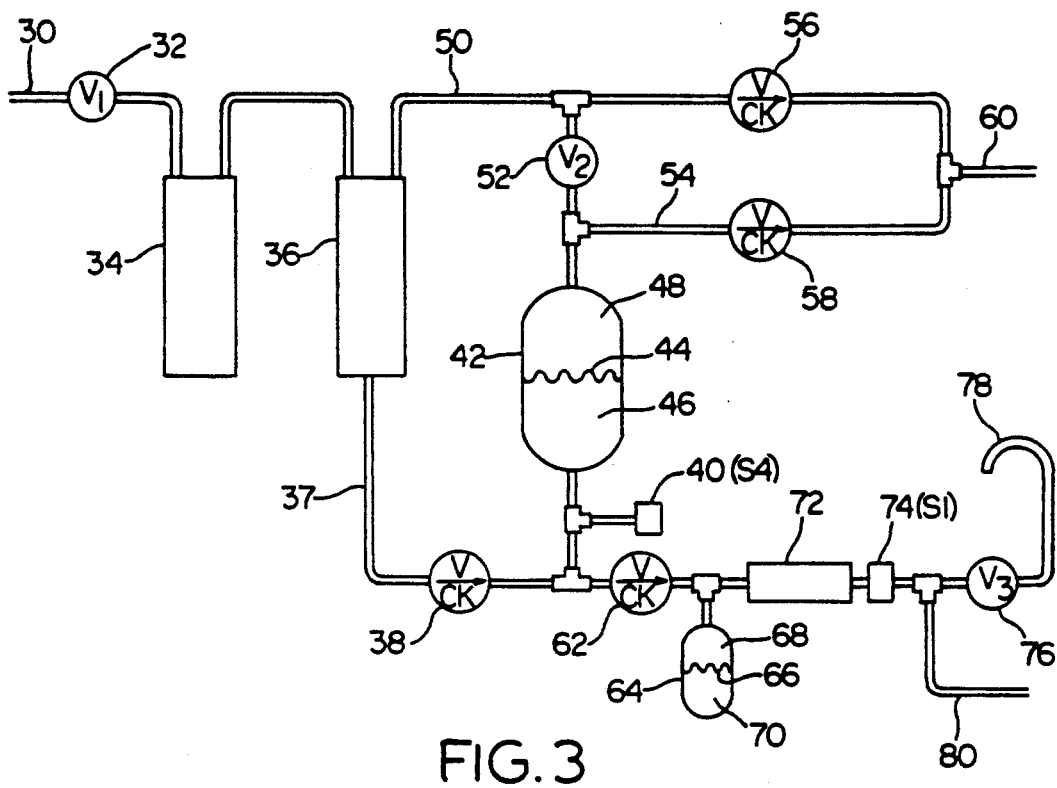
FIG. 3 is a schematic diagram of the water purification apparatus in accordance with the present invention.

As shown in FIG. 3, a supply water line 30 carries supply water from an external water supply source (not shown) to pre-filter 34. Electric solenoid valve V1 32 is disposed in supply water line 30 to permit water inflow into the system. Pre-filtered water is then carried to reverse osmosis cartridge 36, whereupon the water flow is divided into product water and waste water through the reverse osmosis process.

A bladder storage tank 42, commonly known as a water-to-water type storage tank, is divided into two chambers by a bladder 44. A product water chamber 46 receives product water from reverse osmosis cartridge 36, through product water line 37. One-way check valve 38, located in product water line 37, prevents product water from applying pressure to the reverse osmosis cartridge 36. A pressure switch S4 40 located in product water line 37 is a two-pole, single arm switch energizable in a first, low pressure sensing position, and a second, high pressure sensing position.

An accumulator 64, commonly known as a water-to-air accumulator, is located in product water line 37 to provide a relatively high-pressure supply of product water upon initial opening of a product water outlet. Accumulator 64 includes a bladder 66, which divides accumulator 64 into a squeeze air chamber 70 and a product water chamber 68. A one-way check valve 62 prevents reverse water flow from accumulator 64.

Carbon filter 72 provides final filtering of the product water, at the time of product water delivery to product water faucet 78 or alternative product water delivery line 80. A two-arm, single throw, single pole flow switch S1 74 senses water flow to a point of use. Manual valve V3 76 is user-operable to provide water flow through product water faucet 78. An alternative product water delivery line 80 is provided to enable delivery of product water to a remote location through operation of a valve located at the remote location. Use of manual valves such as manual valve V3 76 for product water delivery enables the extension of one or more product water delivery lines 80 without the requirement of extending electrical connections to the remote location.

A waste water line 50 carries impurity-laden waste water from the membrane (not shown) of reverse osmosis cartridge 36. Electric solenoid valve V2 52 is disposed in waste water line 50 to permit waste water inflow into the squeeze water chamber 48 of bladder storage tank 42. Waste water flow restrictor 56 and waste water flow restrictor 58 permit drainage of waste water and squeeze water to reject water line 60 at a predetermined flow rate. Reject water line 60 drains waste water and squeeze water from the system to a suitable drainage receptacle (not shown).

Figure 4:
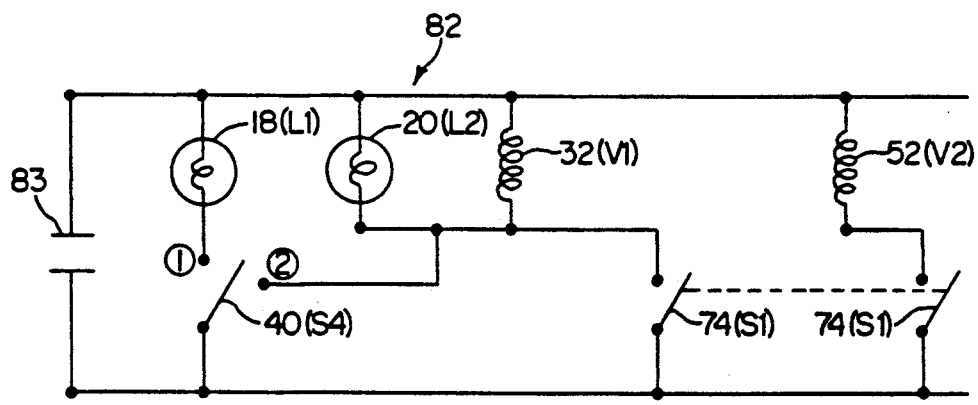
FIG. 4 is a circuit diagram of the electric control for the water purification apparatus in accordance with the present invention.

As shown in FIG. 4, a electric control circuit 82 has a low voltage source 83, preferably between 12 volts and 120 volts AC. Full light L1 18, shown schematically in FIG. 4 and in a mounted position in FIG. 1, is energized by pressure switch S4 40 in a first position. Processing light L2 20 and solenoid valves V1 32 are energized by pressure switch S4 40 in a second position. Normally-open flow switch S1 74 closes upon sensing water flow, thereby energizing solenoid valve V2 52. If pressure switch S4 40 is not in the second position, then flow switch S1 74, when closed, also energizes solenoid valve V1 32 and processing light L2 20.

Operation of the electric control is described in operation chart 88. Where shown in operation chart 88, the letter "C" designates "closed", and the letter "O" designates "open". When the bladder storage tank 42 is full, and manual valve V3 76 is closed, solenoid valves V1 32 and V2 52 remain closed. Flow switch S1 74, detecting no water flow, is open. Pressure switch S4 40, which detects a predetermined minimum amount of product water pressure, normally between 35 kpa and 350 kpa, is in a first position wherein full light L1 18 is energized.

When the manual valve V3 76 is opened, product water is dispensed under a pressure ranging from 35 kpa to 350 kpa. Product water is dispensed first from accumulator 64, which is normally at the highest pressure upon completion of water processing.

Upon detecting flow, flow switch S1 74 closes, energizing solenoid valves V1 32 and V2 52, and causing them to open, and further causing processing light L2 20 to energize. Accordingly, squeeze water chamber 48 is open to supply water pressure, thereby exerting additional pressure on bladder 44, and causing the product water chamber 46 to expel product water. When the product water pressure at pressure switch S4 40 drops below a predetermined minimum amount, preferably between 35 kpa and 350 kpa, pressure switch S4 40 moves to a second position, whereupon full light L1 1 is de-energized. As long as manual valve V3 76 is open, and water flows through it, solenoid valve V1 32 and V2 52 remain open, therefore, dispensing of water through the product water faucet 78 occurs.

After the manual valve V3 76 is closed, processing of water through the reverse osmosis cartridge 36 starts, as shown in operations chart 88. As product water flow ceases, flow switch S1 74 opens. As a result, solenoid valve V2 74 closes, preventing flow of water into the squeeze water chamber 48 of bladder storage tank 42. If, while product water dispensing occurred, product water pressure at pressure switch S4 40 fell below the predetermined minimum amount, pressure switch S4 40 remains in the second position. As a result, solenoid valve V1 32 remains open, permitting supply water inflow into the system, including through reverse osmosis cartridge 36. Waste water is emitted from reverse osmosis cartridge 36 through waste water line 50, and flows through waste water flow restrictor 56 and reject water line 60. Since solenoid valve V2 52 is closed, no pressure is applied to bladder 44 thereby permitting maximum product water flow into the product water chamber 46.

Waste water flow restrictor 56 permits a flow rate appropriate to the reverse osmosis cartridge 36 being used. Squeeze water flow restrictor 58 may have the same or a lower flow rate than waste water flow restrictor 56, however, it preferably has a higher flow rate, so that during a dispensing operation, total reject water flow rate is increased, thereby permitting higher inflow of supply water to the reverse osmosis cartridge 36. As a result, flushing of the reverse osmosis cartridge 36 occurs which in turn increases its operational lifetime.

In this system, pressure switch S4 40 cannot close solenoid valve V1 32 until both the bladder storage tank 42 and the accumulator 64 are filled with product water, at the pressure required to move pressure switch S4 40 to the first position. It can be seen that the accumulator 64 cannot lose pressure to the storage tank 42 because flow in the reverse direction is blocked by one-way check valve 62. In like manner, the bladder storage tank 42 cannot lose pressure to the reverse osmosis cartridge 36 because flow in the reverse direction is blocked by one-way check valve 38. The reverse osmosis cartridge 36 may experience a back pressure only during the final few seconds before pressure switch S4 40 moves to the first position and closes solenoid valve V1 32. Accordingly, reverse osmosis cartridge 36 is protected from damage due to reverse flow against the cartridge.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

What is claimed is:

1. An electrically controlled reverse osmosis water conditioning system adapted for purifying an external water supply, said water conditioning system comprising:

a reverse osmosis filter having a supply water input, a product water output and a waste water output;

a supply water line connectable between said water supply and said supply water input of said reverse osmosis filter for purification for supplying water to said reverse osmosis filter;

a first solenoid valve selectively operable in closed and open positions and located in said supply water line for controlling the flow of supply water to said reverse osmosis filter, a product water storage tank having an internal bladder, said internal bladder dividing said tank into a squeeze chamber and a product water chamber;

a squeeze water line connected between said waste water output of said reverse osmosis filter and said squeeze chamber of said product water storage tank;

a second solenoid valve selectively operable in closed and open positions and located in said squeeze water line for controlling the flow of waste water to said squeeze chamber;

a drain line connected to said squeeze chamber including means for restricting waste water flow for maintaining a minimum predetermined squeeze water pressure in said squeeze chamber;

a product water line connected between said product water output of said reverse osmosis filter and said product water chamber of said product water storage tank;

a pressure switch located in said product water line having a first preselected high pressure position and a second preselected low pressure position;

said pressure switch being operable in said second preselected position to energize and open said first solenoid valve to provide inlet water to said reverse osmosis filter;

a flow switch for sensing product water flow located in said product water line;

said flow switch being operable in a normally open position, said flow switch being movable to a closed position when product water flow is sensed, thereby energizing and opening said first solenoid valve to provide inlet water to said reverse osmosis filter, and further opening said second solenoid valve to provide waste water to said squeeze chamber.

2. The water conditioning system of claim 1, further including a full tank indicator light for indicating a full storage tank condition, said full tank indicator light being energizable by said pressure switch in said first preselected high pressure position.

3. The water conditioning system of claim 1, further including a processing indicator light for indicating water processing, said processing indicator light being energizable by said flow switch when product water flow is sensed.

4. The water conditioning system of claim 3, wherein said processing indicator light is also energizable by said pressure switch in said second preselected high pressure position.

5. The water conditioning system of claim 1, further including a processing indicator light for indicating water processing, said processing indicator light being energizable by said pressure switch in said second preselected high pressure position.

6. The water conditioning system of claim 1, further including a reject water line connected to said squeeze water line, and including a flow restrictor for restricting the flow of reject water therethrough.

7. The water conditioning system of claim 1, wherein said supply water line further includes a prefilter.

8. The water conditioning system of claim 1, wherein said product water line further includes a carbon filter, and a manually operable control valve.

9. An electrically controlled reverse osmosis water conditioning system adapted for purifying an external water supply, said water conditioning system comprising:

a reverse osmosis filter having a supply water input, a product water output and a waste water output;

a supply water line connectable between said water supply and said supply water input of said reverse osmosis filter for purification for supplying water to said reverse osmosis filter;

a product water storage tank having an internal bladder, said internal bladder dividing said tank into a squeeze chamber and a product water chamber;

a squeeze water line connected between said waste water output of said reverse osmosis and said squeeze chamber of said product water storage tank;

a solenoid valve selectively operable in closed and open positions and located in said squeeze water line for controlling the flow of waste water to said squeeze chamber;

a drain line connected to said squeeze chamber including means for restricting waste water flow for maintaining a minimum predetermined squeeze water pressure in said squeeze chamber;

a product water line connected between said product water output of said reverse osmosis filter and said product water chamber of said product water storage tank, said product water line further including a carbon filter;

a flow switch for sensing product water flow located in said product water;

said flow switch being operable in a normally open position, said flow switch being movable to a closed position when product water flow is sensed, thereby energizing and opening said solenoid vale to provide waste water to said squeeze chamber.

10. The water conditioning system of claim 9, further including a processing indicator light for indicating water processing, said processing indicator light being energizable by said flow switch when product water flow is sensed.

11. The water conditioning system of claim 9, further including a reject water line connected to said squeeze water line, and including a flow restrictor for restricting the flow of reject water therethrough.

12. The water conditioning system of claim 9, wherein said supply water line further includes a prefilter.

13. The water conditioning system of claim 12, wherein said product water line further includes a manually operable control valve.

14. An electrically controlled reverse osmosis water conditioning system adapted for purifying an external water supply, said water conditioning system comprising:
- a reverse osmosis filter having a supply water input, a product water output and a waste water output;
- a supply water line connectable between said water supply and said supply water input of said reverse osmosis filter for purification for supplying water to said reverse osmosis filter;
- a first solenoid valve selectively operable in closed and open positions and located in said supply water line for controlling the flow of supply water to said reverse osmosis filter;
- a product water storage tank having an internal bladder, said internal bladder dividing said tank into a squeeze chamber and a product water chamber;
- a squeeze water line connected between said waste water output of said reverse osmosis filter and said squeeze chamber of said product water storage tank;
- a second solenoid valve selectively operable in closed and open positions and located in said squeeze water line for controlling the flow of waste water to said squeeze chamber; a drain line connected to said squeeze chamber including means for restricting waste water flow for maintaining a minimum predetermined squeeze water pressure in said squeeze chamber;
- a product water line connected between said product water output of said reverse osmosis and said product water chamber of said product water storage tank, said product water line further including a carbon filter;
- a flow switch for sensing product water flow located in said product water line;
- said flow switch being operable in a normally open position, said flow switch being movable to a closed position when product water flow is sensed, thereby energizing and opening said first solenoid valve to provide inlet water to said reverse osmosis filter, and further opening said second solenoid valve to provide waste water to said squeeze chamber.

15. The water conditioning system of claim 14, further including a processing indicator light for indicating water processing, said processing indicator light being energizable by said flow switch when product water flow is sensed.

16. The water conditioning system of claim 14, further including a reject water line connected to said squeeze water line, and including a flow restrictor for restricting the flow of reject water therethrough.

17. The water conditioning system of claim 14, wherein said supply water line further includes a prefilter.

18. The water conditioning system of claim 17, wherein said product water line further includes a manually operable control valve.

19. In a reverse osmosis water conditioning system having a reverse osmosis filter with a supply water input, a product water output and a waste water output, a product water storage tank having an internal bladder dividing said tank into a squeeze chamber and a product water chamber, a squeeze water line connected between said waste water output and said squeeze chamber, a drain line connected to said said squeeze chamber including means for restricting waste water flow for maintaining a minimum predetermined squeeze water pressure in said squeeze chamber, a product water line connected between said product water output and said product water chamber, the improvement comprising:
- a first solenoid valve selectively operable in closed and open positions and located upstream of said supply water line for controlling the flow of supply water to said reverse osmosis filter;
- a second solenoid valve selectively operable in closed and open positions and located in said squeeze water line for controlling the flow of waste water to said squeeze chamber;
- a pressure switch located in said product water line having a first preselected high pressure position and a second preselected low pressure position, said pressure switch being operable in said second preselected position to energize and open said first solenoid valve to provide inlet water to said reverse osmosis filter; and
- a flow switch for sensing product water flow located in said product water line, said flow switch being operable in a normally open position, said flow switch being movable to a closed position when product water flow is sensed, thereby energizing and opening said first solenoid valve to provide inlet water to said reverse osmosis filter, and further opening said second solenoid valve to provide waste water to said squeeze chamber.

20. The improvement of claim 19, further including a full tank indicator light for indicating a full storage tank condition, said full tank indicator light being energizable by said pressure switch in said first preselected high pressure position.

21. The improvement of claim 19, further including a processing indicator light for indicating water processing, said processing indicator light being energizable by said flow switch when product water flow is sensed.

22. The improvement system of claim 21, wherein said processing indicator light is also energizable by said pressure switch in said second preselected high pressure position.

23. The improvement of claim 19, further including a processing indicator light for indicating water processing, said processing indicator light being energizable by said pressure switch in said second preselected high pressure position.

24. The improvement of claim 19, further including a reject water line connected to said squeeze water line, and including a flow restrictor for restricting the flow of reject water therethrough.

25. The improvement of claim 19, wherein said supply water line further includes a pre-filter.

26. The improvement of claim 19, wherein said product water line further includes a carbon filter, and a manually operable control valve.

* * * * *